US010834489B2

(12) United States Patent
Huang et al.

(10) Patent No.: US 10,834,489 B2
(45) Date of Patent: Nov. 10, 2020

(54) ELECTRONIC DEVICE MAINBOARD WITH AUDIO PROCESSING FUNCTION

(71) Applicants: BEIJING XIAOMI MOBILE SOFTWARE CO., LTD., Beijing (CN); Shanghai Imilab Technology Co., Ltd., Shanghai (CN)

(72) Inventors: Shoufeng Huang, Shanghai (CN); Wang Liu, Shanghai (CN); Hesong Wang, Shanghai (CN); Li Zhang, Beijing (CN)

(73) Assignees: BEIJING XIAOMI MOBILE SOFTWARE CO., LTD., Beijing (CN); Shanghai Imilab Technology Co., Ltd., Shanghai (CN)

( * ) Notice: Subject to any disclaimer, the term of this patent is extended or adjusted under 35 U.S.C. 154(b) by 0 days.

(21) Appl. No.: 16/360,054

(22) Filed: Mar. 21, 2019

(65) Prior Publication Data

US 2019/0297404 A1 Sep. 26, 2019

(30) Foreign Application Priority Data

Mar. 23, 2018 (CN) .......................... 2018 1 0247426

(51) Int. Cl.
*H04R 3/00* (2006.01)
*H04R 1/04* (2006.01)
(Continued)

(52) U.S. Cl.
CPC ................ *H04R 1/04* (2013.01); *G06F 3/16* (2013.01); *G06F 3/167* (2013.01);
(Continued)

(58) Field of Classification Search
CPC ........................................................ H04R 3/00
See application file for complete search history.

(56) References Cited

U.S. PATENT DOCUMENTS 5,327,496 A * 7/1994 Russell ................ G10K 11/178
375/142
10,109,294 B1 * 10/2018 Ayrapetian ............. G10L 25/78
(Continued)

FOREIGN PATENT DOCUMENTS

CN 107464564 A 12/2017

OTHER PUBLICATIONS

European Patent Office, Extended European Search Report Issued in Application No. 191648955, dated Aug. 9, 2019, Germany, 10 pages.

(Continued)

*Primary Examiner* — Olisa Anwah
(74) *Attorney, Agent, or Firm* — Syncoda LLC; Feng Ma

(57) ABSTRACT

An electronic device mainboard includes a main body; an audio collecting component provided on the main body and configured to collect audio; a main controlling component provided on the main body, connected with the audio collecting component through a printed circuit printed on the main body and configured to receive and analyze the audio and then send out interaction instructions according to the audio; and an interaction component provided on the main body, connected with the main controlling component and configured to receive and execute the interaction instructions.

9 Claims, 4 Drawing Sheets

1 11 121 16 131 13 132 17 121 18 121 122 12 141 142 14 121 123 15

(51) Int. Cl.
*G06F 3/16* (2006.01)
*G10L 21/0216* (2013.01)
*H04R 1/02* (2006.01)
*H04R 5/027* (2006.01)
*H04R 5/04* (2006.01)
*H04R 1/40* (2006.01)
*G10L 21/0208* (2013.01)

(52) U.S. Cl.
CPC .......... *G10L 21/0216* (2013.01); *H04R 1/028* (2013.01); *H04R 1/403* (2013.01); *H04R 5/027* (2013.01); *H04R 5/04* (2013.01); *G10L 2021/02082* (2013.01); *G10L 2021/02166* (2013.01); *H04R 2420/07* (2013.01)

(56) References Cited

U.S. PATENT DOCUMENTS

2010/0166199 A1* 7/2010 Seydoux ............... H04M 9/082 381/66
2017/0040026 A1* 2/2017 Kuo .................... G10L 21/0208
2019/0236208 A1* 8/2019 Lee .......................... G10H 1/00

OTHER PUBLICATIONS

Justin Alvey:"Google Home Mini teardown, comparison to Echo Dot, and giving technology a voice", Oct. 26, 2017, XP055609320, 22 pages.
I-Home Technology Co et al:"Lynky: Touchscreen Smart Flub with Google Assistant", Feb. 24, 2018, XP055585514. 13 pages.
Joseph Keller et al:"How to use Siri with Apple Music", Mar. 27, 2017, XP055438121, 19 pages.

* cited by examiner

ELECTRONIC DEVICE MAINBOARD WITH AUDIO PROCESSING FUNCTION

CROSS-REFERENCE TO RELATED APPLICATIONS

This application claims priority to Chinese Patent Application No. 201810247426.5, filed on Mar. 23, 2018, the disclosure of which is incorporated herein by reference in its entirety.

BACKGROUND

An electronic device, such as a smart speaker, generally possesses a voice control function, and an audio collecting component in the electronic device has a direct impact on accuracy of voice collection. In the related art, due to structural and functional limitations, the audio collecting component is connected with the mainboard through a wire, which leads to audio loss in a transmission process, and consequently, recognition rate of the electronic device to voice is reduced.

SUMMARY

The present disclosure relates to an electronic device mainboard having an audio processing function.

According to a first aspect of an embodiment of the present disclosure, there is provided an electronic device mainboard comprising: a main body; an audio collecting component provided on the main body and configured to collect audio; a main controlling component provided on the main body, connected with the audio collecting component through a printed circuit printed on the main body and configured to receive and analyse the audio and send out interaction instructions according to the audio; and an interaction component provided on the main body, connected with the main controlling component and configured to receive and execute the interaction instructions.

In some embodiments, the audio collecting component comprises a microphone component configured to collect analog signals of the audio; and a signal converter connected with the microphone component through the printed circuit printed on the main body and configured to receive and convert the analog signals to digital signals and send out the digital signals to the main controlling component through the printed circuit printed on the main body.

In some embodiments, the microphone component comprises a plurality of microphone chips distributed in an array.

In some embodiments, the interaction component comprises a playing component configured to play one of an interaction voice and a preset audio according to the interaction instructions.

In some embodiments, the interaction component further comprises a linking component connected with a cloud device and configured to acquire the preset audio in the cloud device.

In some embodiments, the linking component comprises at least one of a WiFi module or a Bluetooth module.

In some embodiments, the main controlling component comprises an echo processing module configured to carry out echo collection and echo cancellation for the audio.

In some embodiments, the main controlling component comprises a noise processing module configured to carry out noise reduction for the audio.

According to a second aspect of an embodiment of the present disclosure, there is provided an audio processing method applied to an electronic device mainboard comprising a main body and an audio collecting component, a main controlling component and an interaction component which are assembled on the main body, where the main controlling component is connected with the audio collecting component through a printed circuit printed on the main body, the method comprising: collecting by the audio collecting component a wakeup voice which is configured to activate the electronic device mainboard to collect an instruction voice; collecting by the audio collecting component the instruction voice under a condition that the main controlling component determines that the wakeup voice matches a preset wakeup voice, where the instruction voice is configured to control the electronic device mainboard to send out interaction instructions; and executing by the interaction component the interaction instructions.

According to a third aspect of an embodiment of the present disclosure, there is provided an audio processing device comprising a processor and a memory storing processor-executable instructions, where the processor-executable instructions are executed by the processor to realize the above audio processing method.

According to a fourth aspect of an embodiment of the present disclosure, there is provided a non-transitory computer readable storage medium having computer instructions stored thereon that are executed by a processor to implement the audio processing method.

According to a fifth aspect of an embodiment of the present disclosure, there is provided an electronic device comprising a shell, a touch panel assembled on the housing, and an electronic device mainboard assembled in the housing; where the touch panel is provided with a sound receiving hole, a size of the electronic device mainboard matches a size of the touch panel, and an audio collecting component of the electronic device mainboard corresponds to the sound receiving hole.

In another aspect, a mobile terminal is provided including the device described above, and further including a microphone and a speaker.

In some embodiments, the mobile terminal is a mobile phone.

In some embodiments, the processor is a general-purpose processor, such as central processing unit (CPU) of the mobile phone, which is configured to not only realize the methods described above but also run programs or applications (Apps) on the mobile phone, such as browsing, gaming, video/textual/voice communications, etc.

In some other embodiments, the processor is an ASIC described above.

In some embodiments, the audio processing device is integrated with the mobile phone; in some other embodiments, the audio processing device can be a plug-and-play device for the mobile phone, and can access and be controlled by the programs/apps/instructions stored on the phone. In some implementations, the audio processing device can draw power from the phone. In some other implementations, the audio processing device can have its own battery.

It is to be understood that both the foregoing general description and the following detailed description are exemplary and explanatory only and are not restrictive of the disclosure.

BRIEF DESCRIPTION OF DRAWINGS

The accompanying drawings, which are incorporated in and constitute a part of the present disclosure, illustrate embodiments consistent with the disclosure and, together with the description, serve to explain the principles of the disclosure.

DETAILED DESCRIPTION

Reference will now be made in detail to some embodiments, examples of which are illustrated in the accompanying drawings. The following description refers to the accompanying drawings in which the same numbers in different drawings represent the same or similar elements unless otherwise represented. The implementations set forth in the following description of some embodiments do not represent all implementations consistent with the disclosure. Instead, they are merely examples of apparatuses and methods consistent with aspects related to the disclosure as recited in the appended claims.

The inventors of the present application have recognized that an electronic device, such as a smart speaker, generally possesses a voice control function, and that an audio collecting component in the electronic device has a direct impact on accuracy of voice collection. However, in the related art, due to structural and functional limitations, the audio collecting component is connected with the mainboard through a wire, which leads to audio loss in a transmission process, and consequently, recognition rate of the electronic device to voice is reduced.

Voice interaction is one of the functions of an electronic device such as a smart speaker, to implement intelligent control and main components involved in the implementation process of voice interaction include: an audio collecting component, a main controlling component and an interaction component. The audio collecting component is configured to collect voice instructions from a user and send the collected voice instructions to the main controlling component, so that the main controlling component may generate interaction instructions for controlling the interaction component by analysing the voice instructions. Therefore, collection and transmission of the audio are key to realizing voice interactions, and part of the audio collecting component related to the collection and transmission of audio directly influences accuracy and fluency of the voice interaction function of the electronic device such as a smart speaker.

Figure 1:
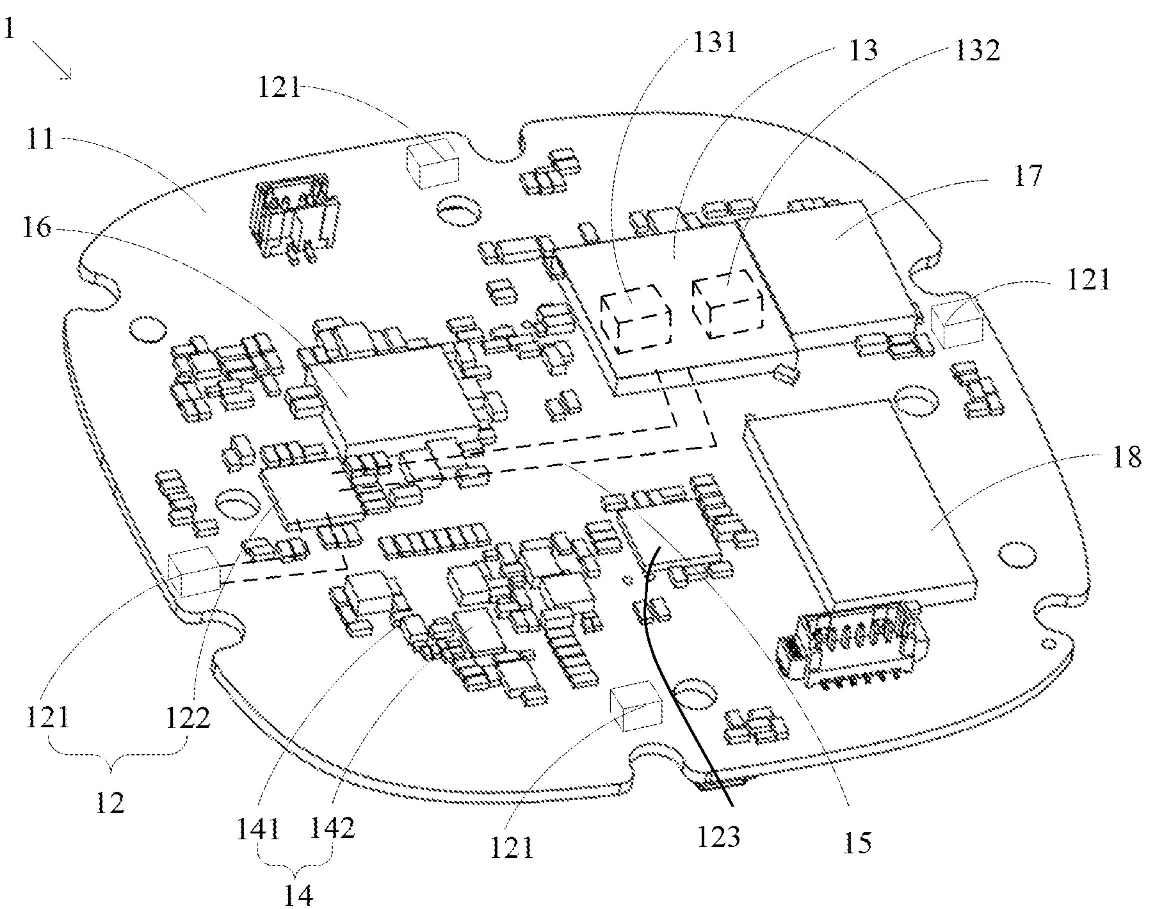
FIG. 1 is a schematic structural diagram of an electronic device mainboard according to some embodiments.

For the above reasons, in some embodiments, the present disclosure provides an electronic device mainboard. As shown in FIG. 1, the electronic device mainboard 1 includes a main body 11, and an audio collecting component 12, a main controlling component 13, and an interaction component 14 which are assembled on the main body 11, where the audio collecting component 12 is connected with the main controlling component 13 via a printed circuit 15 printed on the main body 11 to transmit the collected audio to the main controlling component 13. The main controlling component 13 receives and analyses the audio and then sends out interaction instructions according to the audio. The interaction component 14 is connected with the main controlling component 13 to receive and execute the interaction instructions.

In some embodiments, by arranging the audio collecting component 12 on the main body 11 of the electronic device mainboard 1 and directly connecting the audio collecting component 12 with the main controlling component 13 through the printed circuit 15 printed on the main body 11, the collected audio may be transmitted to the main controlling component 13 through the printed circuit 15 printed on the main body 11. In some embodiments, the audio transmission loss that occurs when the audio collecting component 12 is connected with the main controlling component 13 through a wire or in other ways may be avoided and the voice recognition rate of the audio collected by the audio collecting component 12 may be effectively improved.

In some embodiments, the electronic device mainboard 1 realizes the voice interaction function through the audio collecting component 12, the main controlling component 13 and the interaction component 14 assembled on the main body 11. The following are some embodiments of the specific structural arrangements of the audio collecting component 12, the main controlling component 13 and the interaction component 14.

1) The Audio Collecting Component 12

In some embodiments, the audio collecting component 12 may include a microphone component 121 and a signal converter 122. The microphone component 121 is configured to collect analog signals of the audio, and the signal converter 122 is connected with the microphone component 121 through the printed circuit 15 printed on the main body 11 and is configured to receive the analog signals and convert the analog signals into digital signals. Besides, the signal converter 122 may also be connected with the main controlling component 13 through the printed circuit 15 printed on the main body 11 and configured to send the digital signals to the main controlling component 13, so that the main controlling component 13 may analyse and process the digital signals of the audio.

In some embodiments, the microphone component 121 may include a plurality of microphone chips distributed in an array to collect audio from each direction, thereby improving stereo sense and integrity of the audio. In an example, the microphone component 121 may include four microphone chips distributed in the middle of four sides of the main body 11; alternatively, the microphone component 121 may include eight microphone chips distributed in the middle of four sides of the main body 11 and at the four corners where the four sides intersect, respectively. The number and distribution of the microphone chips in the microphone component 121 are set according to specific requirements, and the present disclosure is not limited thereto.

It should be noted that the microphone chip may be a silicon microphone chip or other types of microphone chip, and the present disclosure is not limited thereto.

2) The Main Controlling Component 13

In some embodiments, the main controlling component 13 is configured to receive and process the audio collected by the audio collecting component 12 and then send out interaction instructions based on the audio. The main controlling component 13 may include a noise processing module 132 and an echo processing module 131. The noise processing module 132 may perform noise reduction processing on the received audio, and the echo processing module 131 may perform echo collection and echo cancellation for the received audio. Echo processing of the audio may also be realized with an individually arranged analog-to-digital converter 123 performing echo collection and sending the collected echo to the echo processing module 131 in the main controlling component 13 for echo cancellation.

The various device components, units, blocks, or portions may have modular configurations, or are composed of discrete components, but nonetheless may be referred to as "modules" in general. In other words, the "components," "modules" or "units" referred to herein may or may not be in modular forms.

In addition, the main controlling component 13 may be provided in a central area of the main body 11 of the electronic device mainboard 1, so as to facilitate connection with the interaction component 14 and the microphone components 121 distributed around the periphery of main body 11, and the present disclosure does not limit the disposition position of the main controlling component 13.

3) The Interaction Component 14

In some embodiments, the interaction component 14 may include a playing component 141. The playing component 141 plays interaction voice or preset audio according to the interaction instructions. In an example, when the audio received by the main controlling component 13 contains "play my song list", the main controlling component 13 sends out an interaction instruction to play my song list according to the audio, and the playing component 141 plays the interaction voice of "play music in my song list for you soon" according to the interaction instruction, and then plays the preset audio in my song list. Playing component 141 may include power amplifier module and speaker module, and signals of the interaction voice and the preset audio are amplified through the power amplifier module, and then played by the speaker module.

Figure 2:
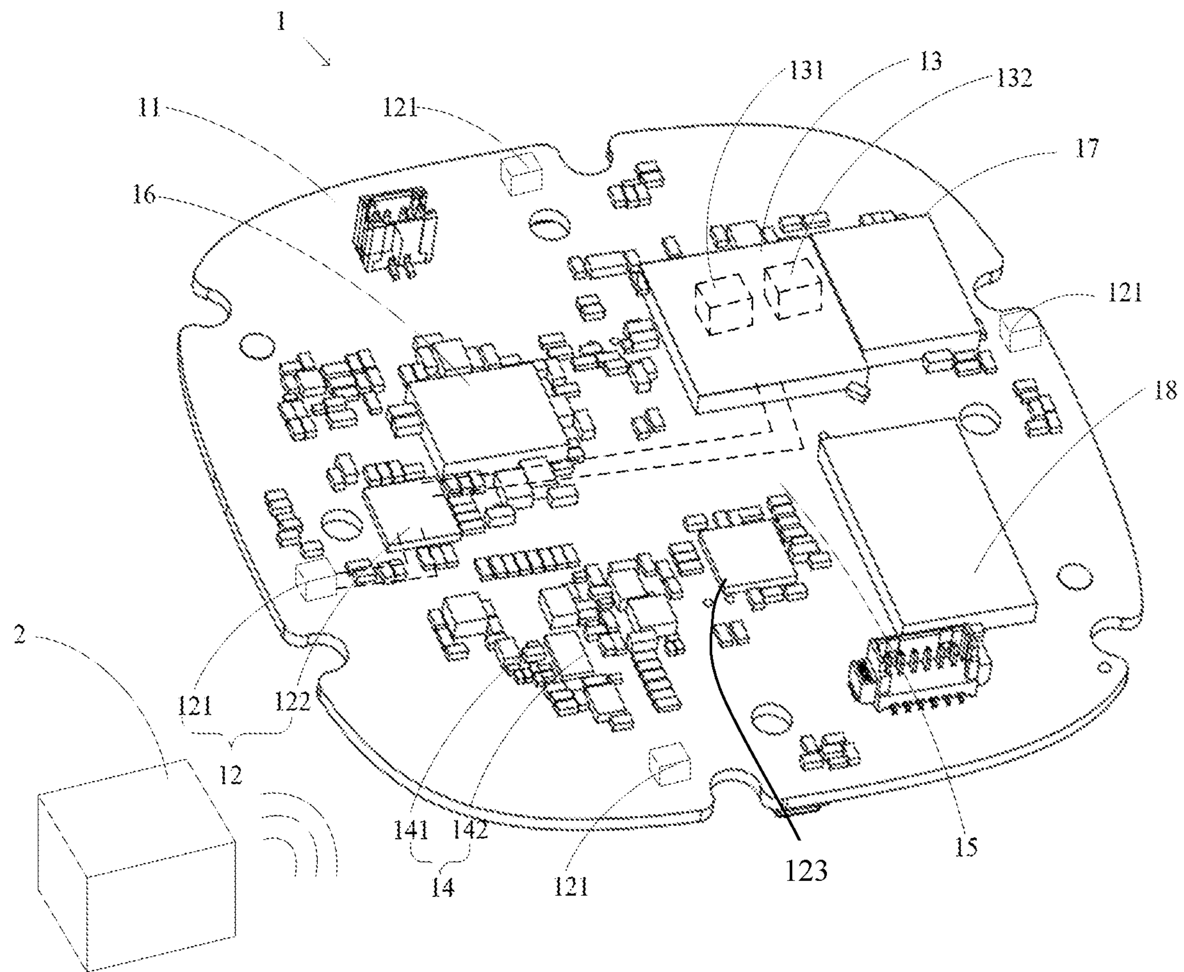
FIG. 2 is a schematic structural diagram of an electronic device mainboard according to some embodiments.

In some embodiments, as shown in FIG. 2, the interaction component 14 may further include a linking component 142, and the linking component 142 is connected with a cloud device 2 to obtain preset audio in the cloud device 2. The linking component 142 may conduct content search through the cloud device 2, thereby enriching content and application range of the voice interaction function. In an example, if the audio received by the main controlling component 13 includes "Today's Weather", the main controlling component 13 sends out an interaction instruction of "searching for Today's Weather through Cloud" according to the audio. Accordingly, the linking component 142 connected with the cloud device 2 searches and obtains today's weather in the cloud device 2 and plays today's weather through the playing component 141.

It should be noted that the linking component 142 may include at least one of a WiFi module and a Bluetooth module, which is not limited in the present disclosure.

In some embodiments, a power management unit (PMU) 16 may be arranged on the main body 11 of the electronic device mainboard 1. The PMU 16 may be a highly integrated power management scheme for portable applications, which integrates several types of power management devices that are generally discrete into a single package, thereby achieving higher power conversion efficiency with less power and components and improving the space utilization of the electronic device mainboard 1. The PMU 16 is respectively connected with the audio collecting component 12, the main controlling component 13, and the interaction component 14 so as to provide power management and control for each part of the mainboard 1.

In some embodiments, the main body 11 of the mainboard 1 may further include a Double Data Rate (DDR) synchronous dynamic random-access memory 17. DDR improves the synchronous circuit, making main steps of transmission and output of designated address and data independently executed while fully synchronized with the central processing unit (CPU). Besides, DDR allows data to be read on the rising and falling edges of a clock pulse, thus improving work efficiency.

In some embodiments, the main body 11 of the mainboard 1 may be further provided with a FLASH chip 18. The FLASH chip 18 is one type of memory device, can hold data for a long time even without current supply, and has high cache efficiency.

Figure 3:
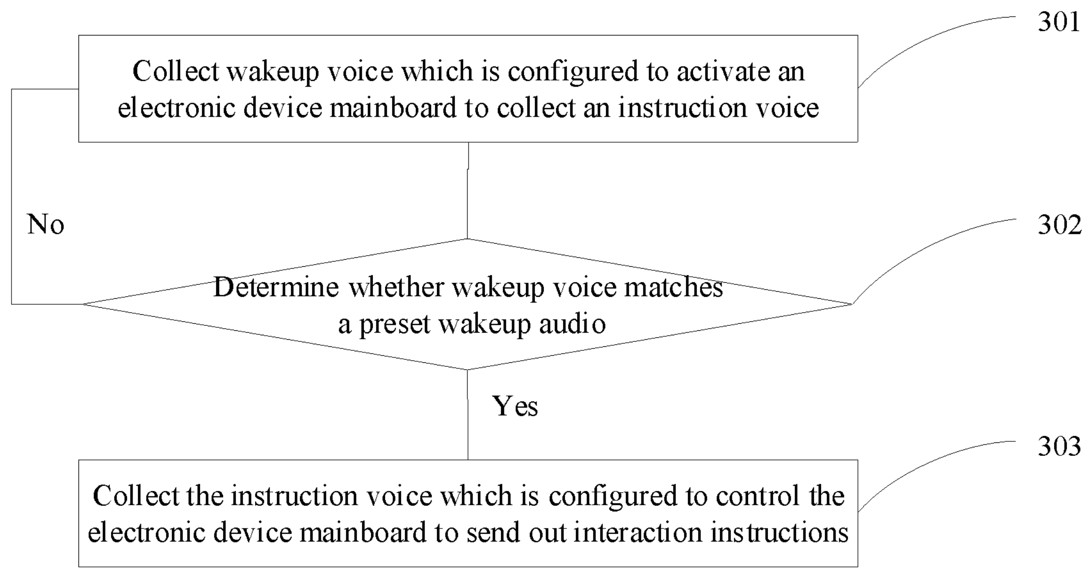
FIG. 3 is a flow chart of an audio processing method according to some embodiments.

In some embodiments, the present disclosure further provides an audio processing method, which may be applied to the mainboard 1 shown in FIG. 1. FIG. 3 is a flow chart of an audio processing method in some embodiments of the disclosure. As shown in FIG. 3, the method may be implemented by the following steps:

At step 301, a wakeup voice is collected, which is configured to activate the mainboard to collect instruction voice;

At step 302, it is determined whether the wakeup voice matches a preset wakeup voice, if not, the wakeup voice is to be collected again; if yes, the instruction voice is collected, where the instruction voice is configured to control the electronic device mainboard to send out an interaction instruction;

At step 303, the interaction instruction is executed.

The whole process of voice interaction starts from the collection of the wakeup voice. The audio collecting component 12 receives the wakeup voice and sends the received wakeup voice to the main controlling component 13. The main controlling component 13 may implement a wakeup based on the received wakeup voice through an array algorithm. The awakened main controlling component 13 continues to receive the instruction voice, generate an interaction instruction according to the instruction voice, and send the interaction instruction to the interaction component 14.

In some embodiments, the interaction component 14 may be a playing component 141 or a linking component 142, where the playing component 141 directly plays the local preset audio according to the interaction instruction; and the linking component 142 enables the main controlling component 13 to be connected with the cloud device 2, and realize recognition and analysis of the interaction instruction as well as synthesis of interaction voice, therefore achieving voice interaction with the user and play of songs or other contents.

Figure 4:
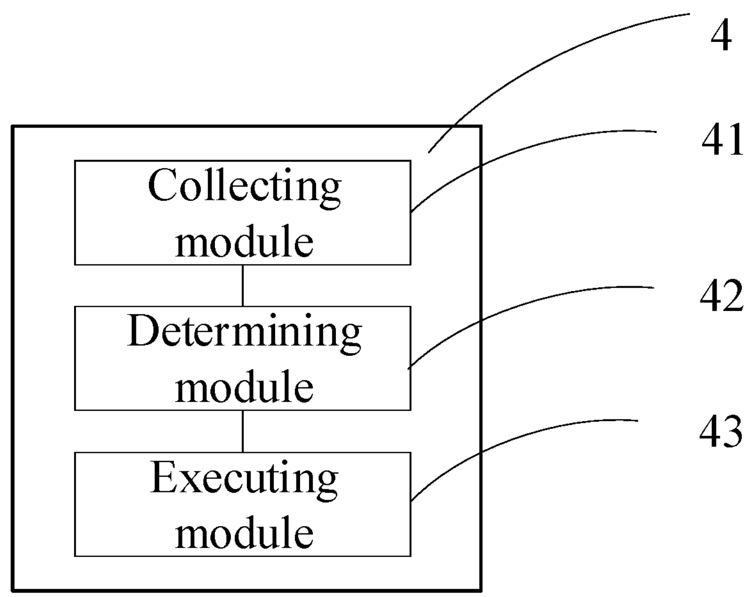
FIG. 4 is a block diagram of an audio processing apparatus according to some embodiments.

Accordingly, the present disclosure further provides an audio processing apparatus. FIG. 4 is a block diagram of an audio processing apparatus in some embodiments of the present disclosure. As shown in FIG. 4, the audio processing apparatus may include: a collecting module 41, a determining module 42, and an executing module 43.

The collecting module 41 is configured to collect a wakeup voice which is configured to activate the mainboard to collect instruction voice;

The determining module 42 is configured to determine whether the wakeup voice matches a preset wakeup audio. If not, the wakeup voice is to be collected again; if yes, collect instruction voice; where the instruction voice is configured to control the mainboard to send out an interaction instruction;

The execution module 43 is configured to execute the interaction instruction.

In some embodiments, the present disclosure further provides a non-transitory computer-readable storage medium, having computer instructions stored thereon, which when executed by a processor, implements the steps of the above-described method, for example, a memory including instructions executable by a processor of the apparatus to perform the above method. In an example, the non-transitory computer-readable storage medium may be ROM, random access memory (RAM), CD-ROMs, magnetic tapes, floppy disks, optical data storage devices, and the like.

Figure 5:
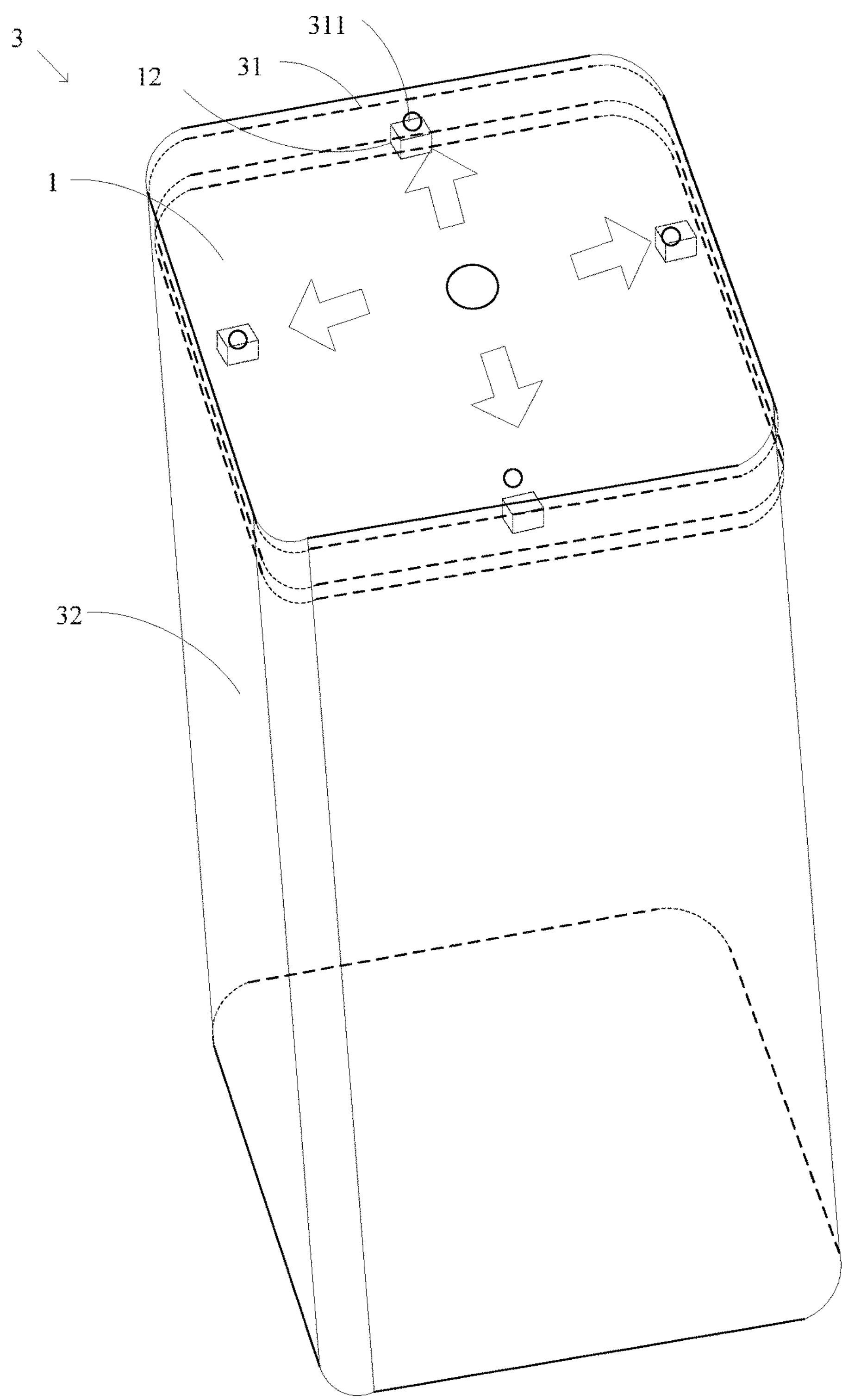
FIG. 5 is a schematic structural diagram of an electronic device according to some embodiments.

The present disclosure further provides an electronic device. In some embodiments, as shown in FIG. 5, the electronic device 3 includes a housing 32, a touch panel 31 assembled on the housing 32, and a mainboard 1 assembled in the housing 32. The touch panel 31 is provided with sound receiving hole 311. A size of the electronic equipment mainboard 1 matches the touch panel 31, and position of the audio collecting component 12 corresponds to that of the sound receiving hole 311.

The audio collecting component 12 and main controlling component 13 of the above mentioned electronic device 3 are assembled on the main body 11 of electronic device mainboard 1, which not only reduces audio transmission loss in the process of audio collection of electronic device, thereby guaranteeing the recognition rate to the collected audio, but also improves the utilization of internal space of the electronic device 3, thereby contributing to overall optimization in structure of the electronic device 3.

In another aspect, a mobile terminal is provided including the device described above, and further including a microphone and a speaker.

In some embodiments, the mobile terminal is a mobile phone.

In some embodiments, the processor is a general-purpose processor, such as central processing unit (CPU) of the mobile phone, which is configured to not only realize the methods described above but also run programs or applications (Apps) on the mobile phone, such as browsing, gaming, video/textual/voice communications, etc.

In some other embodiments, the processor is an ASIC described above.

In some embodiments, the audio processing device is integrated with the mobile phone; in some other embodiments, the audio processing device can be a plug-and-play device for the mobile phone, and can access and be controlled by the programs/apps/instructions stored on the phone. In some implementations, the audio processing can draw power from the phone. In some other implementations, the audio processing device can have its own battery.

At least some of the embodiments of the present disclosure can have one or more of the following advantages: voice interaction is one of the functions of an electronic device such as a smart speaker, to implement intelligent control and main components involved in the implementation process of voice interaction include: an audio collecting component, a main controlling component and an interaction component. The audio collecting component is configured to collect voice instructions from a user and send the collected voice instructions to the main controlling component, so that the main controlling component may generate interaction instructions for controlling the interaction component by analysing the voice instructions. Therefore, collection and transmission of the audio are key to realizing voice interactions, and part of the audio collecting component related to the collection and transmission of audio directly influences accuracy and fluency of the voice interaction function of the electronic device such as a smart speaker.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counterclockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the devices can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a mark-up language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In an example, a user can speak commands to the audio processing device, to perform various operations.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented as part of a smart home or a smart office design, which may implement individually or integrally various electronic devices in a home or office. For example, control or display functions described above may be realized on a smart television (or connected television, hybrid television, etc.), which may include a processing circuit configured to integrate Internet connectivity with more traditional television programming sources (e.g., received via cable, satellite, over-the-air, or other signals). The smart television may be physically incorporated into a television set or may include a separate device such as a set-top box, Blu-ray or other digital media player, game console, hotel television system, and other companion devices. A smart television may be configured to allow viewers to search and find videos, movies, photos and other content on the web, on a local cable TV channel, on a satellite TV channel, or stored on a local hard drive.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. An electronic device, comprising a shell, a touch panel assembled on the shell and an electronic device mainboard assembled in the shell, wherein the touch panel is provided with a sound receiving hole, and a size of the electronic device mainboard matches a size of the touch panel, wherein, the electronic device mainboard comprises:

a main body;

an audio collecting component provided on the main body and configured to collect audio;

a main controlling component provided on the main body, connected with the audio collecting component through a printed circuit printed on the main body and configured to receive and analyze the audio and then send interaction instructions according to the audio; and an interaction component provided on the main body, connected with the main controlling component and configured to receive and execute the interaction instructions; and wherein, the audio collecting component corresponds to the sound receiving hole.

2. The electronic device of claim 1, wherein the audio collecting component comprises:

a microphone component configured to collect analog signals of the audio; and a signal converter connected with the microphone component through the printed circuit printed on the main body and configured to receive and convert the analog signals into digital signals and send the digital signals to the main controlling component through the printed circuit printed on the main body.

3. The electronic device of claim 2, wherein the microphone component comprises:

a plurality of microphone chips distributed in an array.

4. The electronic device of claim 1, wherein the interaction component comprises:

a playing component configured to play one of an interaction voice or preset audio according to the interaction instructions.

5. The electronic device of claim 4, wherein the interaction component further comprises:

a linking component connected with a cloud device and configured to acquire the preset audio in the cloud device.

6. The electronic device of claim 5, wherein the linking component comprises at least one of a WiFi module and a Bluetooth module.

7. The electronic device of claim 1, wherein the main controlling component comprises:

an echo processing module configured to carry out echo collection and echo cancellation for the audio.

8. The electronic device of claim 1, wherein the main controlling component comprises:

a noise processing module configured to carry out noise reduction for the audio.

9. A mobile terminal, comprising the electronic device according to claim 1, further comprising a microphone and a speaker.

* * * * *